Dec. 17, 1929.    E. DABROWSKI    1,740,286
COLLAPSIBLE RAKE
Filed March 7, 1928
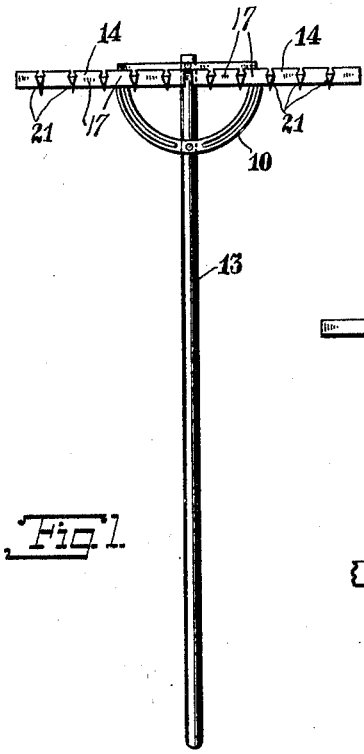
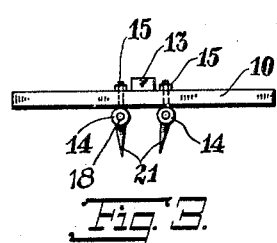
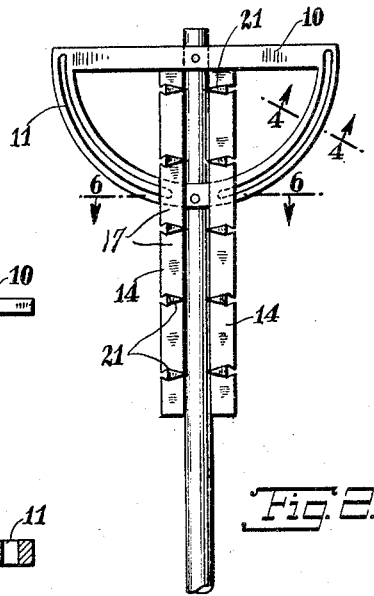
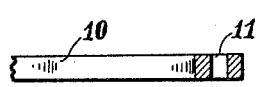
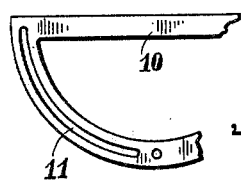
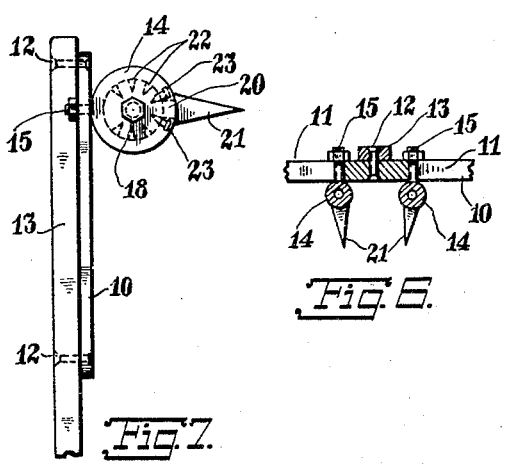
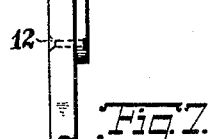
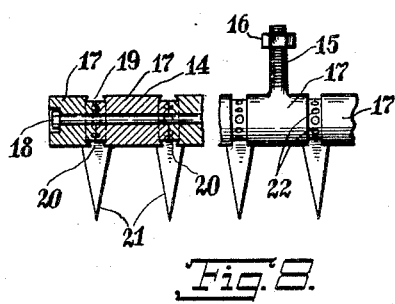
INVENTOR.
Eugene Dabrowski
BY
ATTORNEY Patented Dec. 17, 1929

1,740,286

UNITED STATES PATENT OFFICE

EUGENE DABROWSKI, OF ST. JAMES, NEW YORK

COLLAPSIBLE RAKE

Application filed March 7, 1928. Serial No. 259,619.

This invention relates generally to implements, and has more particular reference to a collapsible rake.

The invention has for an object the provision of a device of the class mentioned, which is of simple durable construction, desirable and efficient in action, and which can be manufactured and sold at a reasonable cost.

The device consists of a semicircular frame formed with a pair of arcuate slots, and attached to a handle. A pair of rake members are slidably arranged on the frame, having bolts projecting into the arcuate slots. In collapsed position these rake members are parallel to the handle, and in extended position at right angles to the handle. The rake members are provided with adjustable fingers which may be positioned at various angles relative to the handle of the device.

For further comprehension of the invention, and of the objects and advantages thereof, reference will be had to the following description and accompanying drawings, and to the appended claims in which the various novel features of the invention are more particularly set forth.

Referring to the accompanying drawing, forming a material part of this disclosure:—

Fig. 1 is an elevational view of a device constructed according to this invention.

Fig. 2 is an enlarged detailed view of a portion of Fig. 1 but with the rake members in folded positions.

Fig. 3 is a plan view of Fig. 2.

Fig. 4 is a fragmentary sectional view, taken on the line 4—4 of Fig. 2.

Fig. 5 is a fragmentary elevational view of the frame used in the device.

Fig. 6 is a horizontal sectional view, taken on the line 6—6 of Fig. 2.

Fig. 7 is a fragmentary side view of Fig. 1.

Fig. 8 is a fragmentary detail plan view of a rake member of the device, partly shown in section.

The reference numeral 10 indicates generally a semi-circular frame formed with a pair of arcuate slots 11. This frame is attached by rivets 12 to one end of a handle 13. A pair of rake members 14 have projecting studs 15 engaging in the arcuate slots so as to be adjustably mounted, and clampable into various positions by nuts 16 engaging the studs 15.

The rake members may be placed in positions parallel with handle 13, as shown in Fig. 2, and this may be called the rake's collapsed condition and the rake members may be placed in extended positions, shown in Fig. 1, with the rake members at right angles to the handle. The nuts 16 may be tightened to hold the members in either position.

The rake members 14 consist of a plurality of sections 17 held together by a bolt 18 and provided with peripheral dove-tailed grooves 19 engaged by the tongues 20 of finger members 21. A plurality of threaded apertures 22 are formed in the base of the grooves 19 and set screws 23 engage the apertures 22 on opposite sides of the tongues 20 to hold the fingers firmly in place, and also to prevent the sections 17 from turning. The apertures 22 are formed partly in one section and partly in the next section, this same condition is true of the grooves 19. The angles of the fingers 21 relative to the handle 13 may be changed by removing the set screws 23, and sliding the fingers in the grooves 19, then reengaging the set screws in positions to hold the fingers against motion.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:—

1. In a device of the class described, a rake member formed of a plurality of sections bolted together and having a plurality of dovetailed peripheral grooves and threaded apertures formed partly in each of the sections, a stud projecting from one section for attaching the rake member to a frame, fingers with dove-tailed tongues engaging in the grooves, and set screws engaging the threaded apertures on opposite sides of the tongues for holding the fingers in place.

2. In a device of the class described, a rake member formed of a plurality of sections bolted together and having a plurality of dovetailed peripheral grooves formed partly in each of the sections and completely in adjacent sections, a stud projecting from one section for attaching the rake member to a frame, fingers with dove-tailed tongues engaging in the grooves, and means for holding the tongues in fixed positions in the grooves.

In testimony whereof I have affixed my signature.

EUGENE DABROWSKI.